United States Patent [19]

Marten et al.

[11] Patent Number: 4,997,907
[45] Date of Patent: Mar. 5, 1991

[54] CURABLE POWDER MIXTURES

[75] Inventors: Manfred Marten, Mainz; Claus Godau, Kiedrich; Gerd Walz, Wiesbaden, all of Fed. Rep. of Germany.

[73] Assignee: Hoechst AG, Fed. Rep. of Germany

[21] Appl. No.: 491,244

[22] Filed: Mar. 9, 1990

[30] Foreign Application Priority Data

Mar. 11, 1989 [DE] Fed. Rep. of Germany ....... 3908031
Nov. 7, 1989 [DE] Fed. Rep. of Germany ....... 3936973

[51] Int. Cl.$^5$ .............................................. C08G 63/02
[52] U.S. Cl. .................................... 528/272; 528/296; 528/297; 528/300; 528/302; 528/307; 528/308; 528/308.6; 525/437; 525/444; 525/448; 525/449; 525/450

[58] Field of Search ............... 528/272, 296, 297, 300, 528/302, 307, 308, 308.6; 525/437, 444, 448, 449, 450

[56] References Cited

U.S. PATENT DOCUMENTS 4,621,122  11/1986  Guilbert et al. ..................... 525/422
4,749,728  6/1988  Craun et al. ......................... 523/400

Primary Examiner—John Kight, III
Assistant Examiner—Sam A. Acquah
Attorney, Agent, or Firm—Bierman and Muserlian

[57] ABSTRACT

The invention relates to curable powder mixtures comprising
(A) carboxyl-containing polyesters,
(B) compounds containing at least two 1,2-epoxide groups, which compounds are reaction products of
  (B1) compounds containing at least two 1,2-epoxide groups per molecule and having an epoxide equivalent weight of 160 to 600 and
  (B2) aromatic dicarboxylic acids or mixtures thereof with compounds selected from the group (cyclo)aliphatic dicarboxylic acids, monocarboxylic acids and/or monohydric phenols, and
  (B3) cyclic anhydrides, if required, and
(C) any customary additives, if appropriate.

These mixtures are distinguished in particular by an improved resistance to yellowing and/or increased reactivity.

15 Claims, No Drawings

CURABLE POWDER MIXTURES

DESCRIPTION

Powder coatings are utilized inter alia for the coating of metal furniture, such as camping equipment, refrigerators, garden furniture and shelving, as well as for the painting of small items and complex-shaped parts, of bicycles, sewing machines and other metallic articles. The great majority of articles painted in this way are made of metal, but plastics, for example, may also be painted using powder coating technology.

Compared with other painting processes, powder coating technology has many advantages. Thus the painting process operates without solvents and is therefore environmentally friendly and more cost-effective. The process is also advantageous as regards waste disposal, work safety (absence of flammable solvents), work hygiene and protection of the environment. Moreover, drying times of the paint films are reduced. The painted article is conveyed directly to the baking oven, the time required for the entire painting process being thereby shortened.

Powder coating technology is based on the principle of electrostatic charge. To apply an electrostatic charge, the corona method, for example, is suitable; by this method the powder coating or the powder is charged by passage across a charged corona. The triboelectric or electrokinetic methods which work on the principle of frictional electricity, are additionally available.

Resins used as powder coating resins are typically epoxy resins, polyester resins containing carboxyl and hydroxyl groups and acrylic resins in conjunction with the corresponding curing agents. Combinations of resins, for example mixtures of epoxy resins and carboxyl-containing polyester resins are also used.

Processing of such hybrid systems may cause yellowing of the paint coatings and of white coatings in particular; yellowing may be due to excessive temperature, to prolonged operational times and to delays and breakdowns in the baking operation. This leads to undesirable rejection in the production of painted parts and articles and is frequently associated with high costs. Powder-coated parts and articles which are exposed to intense sunshine, also tend to yellow, especially under the effect of the UV component.

Japanese Laid-open Specification No. 50-41999 (Nitto Denki Kogyo K.K.) discloses the preparation of an epoxide polymer from an epoxy resin containing at least two glycidyl groups in a molecule, and an aromatic dicarboxylic acid. In this process 0.2 to 0.8 equivalent of acid per epoxide equivalent is polymerized at elevated temperatures in the presence of 0.001 to 5% by weight, based on the total weight of the dicarboxylic acid and the epoxy resin in question, of triphenylphosphine. Hexahydrophthalic anhydride is disclosed as the curing agent for such reaction products.

Powder coatings of this type have inter alia the drawback that the mechanical properties, reactivity and/or resistance to yellowing are insufficient for a number of applications.

We have now found that curable powder mixtures of carboxyl-containing polyesters and of the epoxide compounds described earlier do not have these drawbacks and are in particular outstandingly resistant to yellowing.

Accordingly, the present invention relates to curable powder mixtures comprising
(A) carboxyl-containing polyesters,
(B) compounds containing at least two 1,2-epoxide groups, which compounds are reaction products of
 (B1) compounds containing at least two 1,2-epoxide groups per molecule and having an epoxide equivalent weight of 160 to 600,
 (B2) aromatic dicarboxylic acids or a mixture thereof with compounds selected from the group (cyclo)aliphatic dicarboxylic acids, monocarboxylic acids and/or monohydric phenols, and
 (B3) cyclic anhydrides, if required, and
(C) any customary additives, if appropriate.

The components (A) and (B) are generally present in the mixture according to the invention in such amounts that the equivalence ratio of carboxylic groups in (A) to epoxide and hydroxyl groups in (B) is 0.7 to 1.3, preferably 0.9 to 1.1. In most cases the amount of the component (A) is likely to be 50 to 90% by weight, preferably 65 to 85% by weight, based on the sum total of (A) and (B). In this way an adequate crosslinking density is usually reached.

The component (A) usually has an acid value of 15 to 150, preferably 30 to 100 mg of KOH/g and a glass transition temperature of not less than 35° C., preferably not less than 40° to 60° C. The molecular weight $\overline{M}n$ (number average; determined by gel chromatography with polystyrene as standard) is usually between 600 and 12000, preferably between 2000 and 8000. The carboxyl groups are preferably attached terminally to the molecular chains which may be linear or branched. The terminal groups of (A) generally comprise more than 70% by weight, preferably more than 90% by weight, of carboxyl groups, the chain ends having predominantly on average 2 and more carboxyl groups, partially as carboxylic anhydride groups.

The melt viscosities at 200° C. of the component (A) generally are between 1000 and 8000, preferably between 2000 and 6000 mPas.

The preparation of the component (A) is carried out in a known manner in a single-stage process or preferably in a two-stage process, for example as described in DE-OS No. 2,163,962, by reacting suitable polyols (A1) with suitable polycarboxylic acids or derivatives thereof, in particular anhydrides (A2) The component (A2) is used here in excess. The proportion of (A1) and (A2) is usually such that the equivalence ratio of hydroxyl groups to acid or anhydride groups is 1:3 to 1:1.1, preferably 1:2.2 to 1:1.8.

Compounds which can be expediently used as the component (A1) are those having hydroxyl values in the range of 10 to 80, preferably of 15 to 40, molecular weights Mn (determined by gel chromatography) of 600 to 10000, preferably of 2000 to 8000, and softening points (determined by differential thermal analysis) of 35° to 110° C., preferably of 40° to 90° C. Suitable examples are hydroxyl-containing polyesters, polyethers, polythioethers, polyacetals, polycarbonate and polyesteramide. The polyesters which may be linear or branched, are preferred.

Hydroxyl-containing polyesters of this type are, for example, the reaction products of polyhydric, preferably dihydric and additionally trihydric, if appropriate, alcohols with polybasic, preferably dibasic carboxylic acids. The corresponding polycarboxylic anhydrides or the corresponding polycarboxylic acid esters of monohydric alcohols having 1 to 6 carbon atoms or mixtures thereof may be employed for the preparation of the polyesters instead of the free polycarboxylic acids. The reaction may be also performed in the presence of the customary esterification catalysts. The polycarboxylic acids may be of the aliphatic, cycloaliphatic, aromatic and/or heterocyclic type and, if appropriate, may be substituted, for example, by halogen atoms and/or be unsaturated.

Examples of such carboxylic acids and derivatives thereof are succinic acid, adipic acid, suberic acid, azelaic acid, sebacic acid, phthalic acid, isophthalic acid, trimellitic acid, phthalicanhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimerized and trimerized unsaturated fatty acids, if appropriate in a mixture with monomeric unsaturated fatty acids such as oleic acid, dimethyl terephthalate and bisglycol terephthalate.

Examples of suitable polyhydrate alcohols are ethylene glycol, 1,2- and 1,3-propyleneglycol, 1,4- and 2,3-butyleneglycol, 1,6-hexanediol, 1,8-octanediol, neopentyl glycol, 1,4-bishydroxymethylcyclohexane, 2-methyl-1,3-propanediol, glycerol, trimethylolpropane, 1,2,6-hexanetriol, 1,2,4-butanetriol, trimethylolethane, pentaerythritol, quinitol, mannitol and sorbitol, methylglycoside, also diethylene glycol, triethylene glycol, tetraethylene glycol and higher polyethylene glycols, dipropylene glycol and higher polypropylene glycols as well as dibutylene glycol and higher polybutylene glycols. Polyesters derived from lactones, for example ε-caprolactone, or from hydroxycarboxylic acids, for example ω-hydroxycaproic acid may be also used.

Examples of the component (A2) are in particular trimellitic anhydride (TMA) and adducts of pyromellitic anhydride or maleic anhydride with, for example, piperylene.

Other carboxyl-containing polyesters (A) which are suitable for use according to the invention, are disclosed, for example, in German Pat. No. 3,618,355 and in German Offenlegungsschriften Nos. 2,163,962 and 2,618,729, to which reference is herewith made.

The epoxide compounds (B) used according to the invention contain on average at least 2 epoxide groups per molecule. The epoxide equivalent weight is generally between 300 and 1200, preferably between 400 and 800 and particularly between 450 and 700, while the acid value is in most cases 0.01 to 20, preferably 0.01 to 2 mg of KOH/g. In addition, the epoxides (B) have an average molecular weight $M_n$ (number average; determined by gel chromatography) of 500 to 10000, preferably of 800 to 3000. Depending on the starting components (B1), (B2) and, if appropriate, (B3) and their molar ratio, and the molecular weight of (B), these epoxide compounds are solids having glass temperatures (Tg) of at least 20° C., preferably of at least 35° to 60° C.

The preparation of the epoxide compounds (B) is carried out in a known manner by reacting the compounds (B1) with the acids or mixtures of acids according to (B2), for example by heating the components for several hours in the absence of oxygen at temperatures of 100° to 250° C., preferably 140° to 180° C., expediently in the presence of a catalyst.

If the component (B3) is used at the same time, the preparation is usually carried out in two stages. The first stage is initially carried out as described above, when a product having acid values lower than 20 mg of KOH/g, preferably lower than 2 mg of KOH/g, is generally aimed for. Subsequently, in the second stage, the reaction product of (B1) and (B2) is reacted with the cyclic anhydride (B3) by heating the components for several hours in the absence of oxygen at temperatures of 100°-200° C., preferably 120°-160° C., until an acid value lower than 5 mg of KOH/g, preferably lower than 2 mg of KOH/g, has been reached.

The 1,2-epoxide compounds used as the component (B1) according to the invention have on average at least two 1,2-epoxide groups per molecule; accordingly they represent polyepoxide compounds and usually have a glass temperature of at least 10° C. They may be both saturated and unsaturated and may be aliphatic, cycloaliphatic, aromatic and heterocyclic; they may also comprise hydroxyl groups. They may furthermore comprise such substituents which do not lead to interfering side reactions under the mixing or reaction conditions, for example alkyl or aryl substituents, ether groups and the like.

Such polyepoxide compounds (B1) are, for example, those derived from polyhydric phenols, for example from resorcinol, from hydroquinone, from 4,4'-dihydroxydiphenylmethane, from isomeric mixtures of dihydroxydiphenylmethane (bisphenol F), from 4,4'-dihydroxy-3,3'-dimethyldiphenylmethane, from 4,4,-rihydroxydiphenyldimethylmethane (bisphenol A), from 4,4'-dihydroxydiphenylmethane, from 4,4,-dihydroxydiphenylcyclohexane, from 4,4,-dihydroxy-3,3'-dimethyldiphenylpropane, from 4,4'-dihydroxydiphenyl, from 4,4,-dihydroxydiphenylsulfone, from tris(4-hydroxyphenyl)methane, from 4,4,-dihydroxybenzophenone, bis(4-hydroxyphenyl)-1,1-isobutane, bis(4-hydroxy-tert.-butylphenyl)-2,2-propane, bis(2-hydroxynaphthyl)methane, 1,5-dihydroxynaphthalene and bis(4-hydroxyphenyl)ether; in addition from the hydrogenation, chlorination and bromination products of the compounds cited above and from novolaks (i.e. from reaction products of mono- or polyhydric phenols with aldehydes, in particular formaldehyde in the presence of acid catalysts).

The polyglycidyl ethers of polyhydric alcohols are also suitable as the component (B1). Examples of such polyhydric alcohols are trimethylolpropane and bis(4-hydroxycyclohexyl)-2,2-propane.

Solid acrylate resins which comprise glycidyl groups and are compatible with the component (B1), for example suitable polymers based on glycidyl methacrylate, should also be considered.

Other compounds suitable for use as the component (B1) are compounds such as (poly)glycidyl esters of the formula

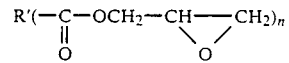

wherein R' is a linear or branched, saturated or unsaturated hydrocarbon radical of up to 40, preferably up to 10 carbon atoms, or a substituted or unsubstituted phenyl radical, and n is at least 2, preferably 2 to 5. Such polyglycidyl esters of polycarboxylic acids are obtained by reacting epichlorohydrin or similar epoxide compounds with an aliphatic, cycloaliphatic or aromatic polycarboxylic acid such as oxalic acid, adipic acid, glutaric acid, terephthalic acid, hexahydrophthalic acid, 2,6-naphthalenedicarboxylic acid and dimerized fatty acids. Appropriate examples are diglycidyl terephthalate and diglycidyl hexahydrophthalate.

Further compounds which are suitable for use as the polyepoxides (B1) are triglycidyl isocyanurate and/or its oligomers and triglycidyl urazole and its oligomers and corresponding mixtures.

These polyepoxide compounds may be also used in admixture with each other as well as, if appropriate, in admixture with monoepoxides, in which case care must be taken that the mixture of 1,2-epoxide compounds has a glass temperature of at least 10° C. If 1,2-epoxide compounds of lower glass temperatures are used in the mixture, they can be used only to a small extent and then only in combination with the corresponding high-melting 1,2-epoxide compounds in order that the glass temperature of the component B) is at least 10° C.

Examples of suitable monoepoxides are: epoxidized mono-unsaturated hydrocarbons (butylene oxide, cyclohexene oxide, styrene oxide), halogen-containing epoxides, for example epichlorohydrin; epoxide ethers of monohydric alcohols (methyl, ethyl, butyl, 2-ethylhexyl and dodecyl alcohol); epoxide ethers of monohydric phenols (phenol, cresol as well as other phenols substituted in the ortho or para position); glycidyl esters of unsaturated carboxylic acids, epoxidized esters of unsaturated alcohols and unsaturated carboxylic acids as well as acetals of glycidaldehyde.

Other epoxide compounds with suitable melting points are described in the handbook "Epoxidverbindungen und Epoxidharze" ["Epoxide Compounds and Epoxy Resins"] by A. M. Paquin, Springer Verlag, Berlin 1958, Chapter IV, in "Handbook of Epoxy Resins" by Lee and Neville, 1967, Chapter 2 and in "Lackkunstharze" ["Synthetic Resins for Paints"] by Wagner and Sarx, Carl Hanser Verlag (1971), p. 174 ff.

Preferred epoxide compounds (B1) are poly(epoxyalkyl) ethers of aliphatic or cycloaliphatic polyhydroxyl compounds such as those of trimethylolethane, trimethylolpropane, tris(hydroxyethyl) isocyanurate and pentaerythritol; reaction products of epihalohydrins, such as epichlorohydrin, with monomeric polybasic phenols such as 2,2-bis(4-hydroxyphenyl)propane, 1,1-bis(4-hydroxyphenyl)ethane, bis(4-hydroxyphenyl)methane, 4,4'-dihydroxydiphenylsulfone, hydroquinone, resorcinol, dihydroxydiphenyl, dihydroxynaphthalene, and trisglycidyl isocyanurate; glycidyl ethers of polybasic phenolic compounds such as novolaks and resols, obtained by the condensation of phenol and/or cresols with formaldehyde; polyglycidyl esters of polycarboxylic acids such as diglycidyl esters of phthalic acid, isophthalic acid, terephthalic acid, tetrahydrophthalic acid, hexahydrophthalic acid, polyglycidyl esters derived from polyesters as well as compounds with free carboxylic groups.

Epoxy resins based on bisphenol A and epichlorohydrin having epoxide equivalent weights in the range of 160–600, preferably 160–200, are particularly preferably employed as (B1).

The compounds (B2) represent aromatic dicarboxylic acids or mixtures of these aromatic dicarboxylic acids with (cyclo)aliphatic dicarboxylic acids, monocarboxylic acids and/or monohydric phenols.

Examples of aromatic dicarboxylic acids are terephthalic acid, isophthalic acid, phthalic acid or various naphthalene dicarboxylic acids, such as 2,6-naphthalenedicarboxylic acid, terephthalic acid being particularly preferred. Mixtures of the aromatic dicarboxylic acids may also be used.

Other suitable aromatic carboxylic acids are those of the type

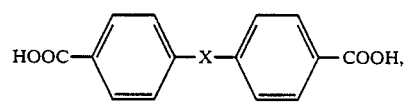

in which X stands for a chemical bond, an alkylene radical of 1 to 6 carbon atoms, O or CO.

The term "(cyclo)aliphatic" dicarboxylic acids is intended to include the corresponding aliphatic or cycloaliphatic acids as well as mixtures thereof.

Examples of aliphatic dicarboxylic acids whose aliphatic radical generally comprises 1 to 20, preferably 2 to 12 carbon atoms, are succinic acid, glutaric acid, adipic acid, suberic acid, azelaic acid, sebacic acid and dodecane diacid.

Examples of suitable cycloaliphatic carboxylic acids whose cycloaliphatic radical in most cases comprises 5 to 12, preferably 6 to 8 carbon atoms, are the various cyclohexanedicarboxylic acid isomers, hexahydrophthalic acid and tetrahydrophthalic acid.

Examples of suitable monocarboxylic acids which comprise generally 3 to 20, preferably 3 to 12 carbon atoms, are benzoic acid, α- and β-naphthoic acid, o-, m- and p-toluic acid, anisic acid and veratric acid; also branched or straight-chain aliphatic monocarboxylic acids, such as acetic acid, propionic acid, buteric acid, lauric acid, stearic acid, isooctanoic acid, isononanoic acid, or hydroxymonocarboxylic acids, such as glycolic acid, lactic acid and dimethylolpropionic acid.

The polybasic phenols may be mononuclear or polynuclear. Examples are phenol, o-, m- and p-cresol, xylenols, guaiacol, thymol, carvacrol, α- or β-naphthol, p-tert.-butylphenol and the like.

If the component (B2) represents a mixture of an aromatic dicarboxylic acid and (cyclo)aliphatic dicarboxylic acids, monocarboxylic acids and/or aromatic alcohols, the amount of these components present apart from the aromatic dicarboxylic acid is generally 0.1 to 20% by weight, preferably 1 to 5% by weight, based on the aromatic dicarboxylic acid.

The components (B1) and (B2) are normally used in such amounts that the equivalence ratio of epoxide to carboxylic groups is 6:5 to 2:1, preferably 3:2 to 2:1. If (B3) is used at the same time, 0.01–1 mol, preferably 0.1–0.4 mol of the cyclic anhydride (B3) is generally used per mol of the reaction product obtained from (B1) and (B2). Suitable cyclic polycarboxylic anhydrides (B3) are expediently those which comprise 4 to 20, preferably 4 to 10 carbon atoms, and may also carry substituents, if appropriate, such as halogen, in particular chlorine, as well as carboxylic groups. They may be derived from (cyclo)aliphatic, olefinically unsaturated or aromatic polycarboxylic acids. Examples of these are: succinic anhydride, alkenylsuccinic anhydrides such as dodecenylsuccinic anhydride, glutaric anhydride, maleic anhydride, citraconic anhydride (methylmaleic anhydride), dichloromaleic anhydride, aconitic anhydride (1-propene-1,2,3-tricarboxylic acid-1,2-anhydride), tricarballylic anhydride (propane-1,2,3-tricarboxylic anhydride), itaconic anhydride (methylenesuccinic anhydride), cyclopentanetetracarboxylic anhydride, $\Delta^4$-tetrahydrophthalic anhydride, 4-methyl-$\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride(=nadic anhydride, 4-methyl-3,6-endoxethylene-$\Delta^4$-tetrahydrophthalic anhydride (=methylnadic anhydride); 3,4,5,6,7,7-hexachloro-3, 6-endomethylenetetrahydrophthalic anhydride (=chlorendic anhydride), the Diels-Alder adduct from 2 mol of maleic anhydride and 1 mol of 1,4-bis(cyclopentadienyl)-2-butene or Diels-Alder adduct from maleic anhydride and conjugated unsaturated fatty acids, such as 2,4-hexadienic acid (sorbic acid), 9,11-octadecadienic acid (ricinic acid), 9,11,13-octadecatrienic acid (eleostearic acid), 9,11,13,14-octadecatetraenic acid, furthermore anhydrides of an aromatic polycarboxylic acid such as phthalic anhydride, trimellitic anhydride, pyromellitic dianhydride or benzophenonetetracarboxylic dianhydride. However, it is also possible to use cyclic anhydrides of polycarboxylic acids which contain other carboxycyclic rings and whose carboxyl groups are located on different rings which may be fused, for example 1,8-naphthalenedicarboxylic anhydride.

Succinic anhydride, phthalic anhydride and the cycloaliphaticdicarboxylic anhydrides available from cheap petrochemical raw materials by a Diels-Alder addition reaction, for example $\Delta^4$-tetrahydrophthalic anhydride or hexahydrophthalic anhydride.

For the aimed-for accelerated reaction of the carboxyl groups with the component (B2) and the epoxide groups of the component (B1) the following compounds, for example, may be used as catalysts: sodium hydroxide, potassium hydroxide, lithium hydroxide, sodium carbonate, chromium compounds such as $CrCl_3$, $CrO_3$, chromium and acetylacetonate, imidazoles, quaternary ammonium and phosphonium compounds such as benzyltrimethylammonium chloride, tetraethylammonium chloride, tetramethylammonium chloride, benzyltrimethylammonium hydroxide, benzyldodecyldimethylammonium chloride, methyltriphenylphosphoniumiodide, triphenyl(2,5-dihydroxyphenyl)phosphonium hydroxide, ethyltriphenylphosphonium acetate, triphenylethylphosphonium bromide as well as organic phosphines such as triphenylphosphine, tricyclohexylphosphine, tributylphosphine and cyclohexyloctylphosphine, furthermore aromatic amines such as N,N-dimethylaniline, N,N-diethylaniline, N,N-dimethyl-p-toluidine, N,N-diethyl-p-toluidine, as well as amines such as triethylamine, tributylamine, benzyldimethylamine, benzyldiethylamine, triethylenediamine, N-methylmorpholine, N-methylpiperidine, N-alkylamines such as n-butylamine, and alkanolamines such as diethanolamine, dimethylethanolamine, diethylethanolamine, dibutylethanolamine, methyldiethanolamine, di-(3-phenoxy-2-hydroxypropyl)alkylamines such as di(3-phenoxy-2-hydroxypropyl)-n-butylamine. Preferred compounds are those of the formula (I)

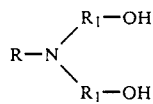

wherein
R is hydrogen, straight-chain or branched alkyl radical of 1 to 18, preferably 1 to 4 carbon atoms; cycloaliphatic alkyl radical of 5 to 12, preferably 5 to 8 carbon atoms or directly —$R_1$OH;
$R_1$ is straight-chain or branched alkylene radical of 2 to 6, preferably 2 or 3 carbon atoms which can additionally carry substituents —$OR_2$, $R_2$ being $R_1$ or a substituted or unsubstituted aromatic ring.

Particularly preferred representatives of this formula (I) are triisopropanolamine and/or triethanolamine. These catalysts are generally used in amounts of 0.01 to 1%, preferably 0.05 to 2%, based on the total of (B1) and (B2).

The reaction products from (B1), (B2) and, if appropriate, (B3) may be also used in admixture with the known epoxy resins, for example those based on bisphenol A or bisphenol F.

Additives commonly employed in the powder coating sector, such as flow control agents, dyes, pigments, fillers, stabilizers, catalysts for accelerating the cross-linking reaction, plasticizers, additional curing agents, additional curable resins and the like may be used as the component (C). These additives are generally employed in amounts of 0 to 50, preferably 0.1 to 40% by weight, based on the total powder coating mixture. Any liquid or paste-like additives may be utilized inter alia in admixture with highly active silicic acid as a masterbatch (see German Pat. No. 2,202,907).

Examples of suitable catalysts for accelerating the reaction between the carboxyl groups of the component (A) and the epoxide groups of the component (B) are the following: zinc naphthenate, zinc octoate, tin octoate, dibutyltin dilaurate, lithium benzoate, lithium hydroxide, tin chloride, zinc chloride, titanium, vanadium and zirconium alcoholates, metal salts of organic carboxylic acids, quaternary ammonium and phosphonium salts, salts of phosphoric acid, amines and amidines, phosphines, substituted and non-substituted ureas and polyureas, pyrazolones, pyrimidines and imidazol and its derivatives. The amounts of such catalysts used are generally about 0.05 to 5, preferably about 0.1 to 2% by weight, based on the polyester (A).

Flow control agents based on commercial acrylate oligomers may be added in amounts of 0.1-4% by weight, preferably 0.5-2.0% by weight, based on the component (B).

Examples of stabilizers are aromatic diketones such as benzoin, which prevent spot decompositions and thus suppress pore formation. They are generally employed in amounts of 0.1 to 3, preferably of 0.2 to 2% by weight, based on the total binder (component (A) and (B)).

Examples of dyes or pigments which may be of an inorganic or organic type, are titanium dioxide and zinc oxide. The organic dyes/pigments should be naturally selected such that they are stable at curing temperatures and do not lead to unacceptable color shifts.

Examples of suitable fillers are quartz powder, silicates, chalk, gypsum and the like.

To prepare the curable mixtures according to the invention the components (A), (B) and, if appropriate, (C) are first mixed and homogenized in the molten state. This can be carried out in suitable equipment, for example in heatable kneaders, double Z mixers, extruders, preferably by the last-named; the extrusion temperature should be chosen such that the mixture is subjected to maximum shearing. In this operation an upper temperature limit of 140° C. should not be exceeded. If catalysts are used, it may be expedient to add these to the component (A) or (B). This can be also done, for example, in the preparation of the component (B).

The homogenized material is allowed to cool to room temperature, is subjected to preliminary size reduction and is then ground to a curable powder mixture (powder coating), the average particle size aimed-for being about 40 to 90 μm, but preferably about 50 μm, depending on application. Any part of a particle size greater than 90 μm which may be present, is removed by sieving.

The powder coatings prepared in this manner may be applied to suitable substrates, for example metal, wood, glass, concrete, plastics, ceramics etc, using known methods, for example by electrostatic powder spraying, fluidized bed coating, electrostatic fluidized bed coating and flame spraying.

When the powder coating has been applied by one of the above methods, the coated parts are cured by being heated to a temperature of 140° to 220° C., preferably 160° to 210° C., for a period which is adequate for curing to take place, generally 10 to 60 minutes. The coatings obtained in this manner are distinguished by good paint properties, such as good mechanical properties, good chemical resistance, good weathering resistance, good adhesion etc. The powder coatings according to the invention are thus suited in particular for coating of heat-resistant materials, for example metal, glass and ceramics.

EXAMPLES

Carboxylpolyesters (A)

The branched carboxylpolyester resins used are characterized by the characteristics listed in Table 1.

Epoxy resins (B)

Epoxy resin I (comparison)

Commercial bisphenol A epoxy resin for the preparation of powder coatings having the following characteristics:

| | |
|---|---|
| Epoxide equivalent | about 800 |
| Viscosity 25° C. | |
| 40% solution in butyl diglycol according to DIN 53015 | about 500 mPa.s |
| Melting point Capillary method according to DIN 53015 | about 70° C. |
| Glass transition temperature | about 50° C. |

Expoxy resin II

Preparation 768 g of a liquid bisphenol A epoxy resin having an epoxide equivalent of 183 (4.20 Val) and 232 g of terephthalic acid (1.40 mol) were heated to 150° C. in a four-necked flask under nitrogen with stirring; 1 g of triethanolamine was added and the temperature was maintained at about 150° C. After 6 hours the acid value was about 18 mg of KOH/g, after a total reaction time of 12 hours the acid value found was 10 mg of KOH/g and the reaction was terminated by emptying the flask.

| Characteristics: | |
|---|---|
| Epoxide equivalent | 640 |
| Acid value | 10 mg of KOH/g |
| Viscosity at 25° C. | 360 mPa.s |
| (40% solution in butyl diglycol) | |
| Glass transition temperature | 45.4° C. |

Epoxy resin III

Preparation 1586 g of a liquid bisphenol A epoxy resin having an epoxide equivalent of 183 (8.67 Val) and 360 g of terephthalic acid (4.34 Val) were heated to 170° C. in a four-necked flask under nitrogen with stirring; 2 g of triethanolamine were added and the temperature was maintained at about 170° C. After 5 hours the acid value was about 0.3 mg of KOH/g and the epoxide equivalent about 463. The reaction product was then cooled to 140° C. and 54 g (0.54 mol) of succinic anhydride were added. The temperature was maintained at about 140° C. After a reaction time of 1.5 hours the acid value was 0.5 mg of KOH/g. After a further 0.5 hours the reaction was terminated by emptying the flask.

| Characteristics: | |
|---|---|
| Epoxide equivalent | 555 |
| Acid value (toluene/ethanol) | 0.2 mg of KOH/g |
| Viscosity at 25° C. | 411 mPa.s |
| (40% solution in butyl diglycol) | |
| Glass transition temperature | 40.0° C. |

Epoxy resin IV

Preparation 1552 g of a liquid bisphenol A epoxy resin having an epoxide equivalent of 183 (8.48 Val) and 352 g of terephthalic acid (4.24 Val) were heated to 170° C. in a four-necked flask under nitrogen with stirring; 2 g of triethanolamine were added and the temperature was maintained at about 170° C. After 4 hours the acid value was about 0.6 mg of KOH/g and the epoxide equivalent about 459. The reaction product was then cooled to 140° C. and 97 g (0.64 mol) of tetrahydrophthalic anhydride were added. The temperature was maintained at about 140° C. After 1.5 hours the acid value was 1.4 mg of KOH/g. After a further hour the reaction was terminated by emptying the flask.

| Characteristics: | |
|---|---|
| Epoxide equivalent | 582 |
| Acid value (toluene/ethanol) | 0.5 mg of KOH/g |
| Viscosity at 25° C. | 541 mPa.s |
| (40% solution in butyl diglycol) | |
| Glass transition temperature | 43.4° C. |

Epoxy resin V

Preparation 1550 g of a liquid bisphenol A epoxy resin having an epoxide equivalent of 183 (8.47 Val) and 380 g of terephthalic acid (4.58 Val) were heated to 170° C. in a four-necked flask under nitrogen with stirring; 2 g of triethanolamine were added and the temperature was maintained at about 170° C.

After 5 hours the acid value was about 0.4 mg of KOH/g and the epoxide equivalent about 503. The reaction product was then cooled to 140° C. and 70 g (0.46 mol) of tetrahydrophthalic anhydride were added. The temperature was maintained at about 140° C. After a reaction time of 1 hour the acid value was 1.9 mg of KOH/g. After a further hour the reaction was terminated by emptying the flask.

| Characteristics: | |
|---|---|
| Epoxide equivalent | 613 |
| Acid value (toluene/ethanol) | 0.6 mg of KOH/g |
| Viscosity at 25° C. | 491 mPa.s |
| Glass transition temperature | 47.7° C. |

Epoxy resin VI

Preparation 1553 g of a liquid bisphenol A epoxy resin having an epoxide equivalent of 183 (8.49 Val) and 352 g of terephthalic acid (4.24 Val) were heated to 170° C. in a four-necked flask under nitrogen with stirring; 2 g of triethanolamine were added and the temperature was maintained at about 170° C. After 5 hours the acid value was about 0.6 mg of KOH/g and the epoxide equivalent about 456. The reaction product was then cooled to 140° C. and 94 g (0.64 mol) of phthalic anhydride were added. The temperature was further maintained at about 140° C. After a reaction time of 1 hour the acid value was 1.0 mg of KOH/g. After a further hour the reaction was terminated by emptying the flask.

| Characteristics: | |
|---|---|
| Epoxide equivalent | 586 |
| Acid value (toluene/ethanol) | 0.7 mg of KOH/g |
| Viscosity at 25° C. | 638 mPa.s |
| Glass transition temperature | 45.9° C. |

Epoxy resin VII

Preparation 1536 g of a liquid bisphenol A epoxy resin having an epoxide equivalent of 183 (8.54 Val) and 355 g of terephthalic acid (4.27 Val) were heated to 170° C. in a four-necked flask under nitrogen with stirring; 2 g of triethanolamine were added and the temperature was maintained at about 170° C. After 5 hours the acid value was about 0.5 mg of KOH/g and the epoxide equivalent about 460. The reaction product was then cooled to 140° C. and 82 g (0.53 mol) of hexahydrophthalic anhydride were added. The temperature was maintained at about 140° C. After a reaction time of 1 hour the acid value was 1.8 mg of KOH/g. After a further hour the reaction was terminated by emptying the flask.

| Characteristics | |
|---|---|
| Epoxide equivalent | 564 |
| Acid value (toluene/ethanol) | 0.5 mg of KOH/g |
| Viscosity at 25° C. | 380 mPa.s |
| Glass transition temperature | 42.2° C. |

The tested powder coatings listed in Tables 3a/3b were prepared by extrusion of the powder coating mixtures composed of carboxylpolyester, epoxy resin, pigment and additives in the mixing proportions listed in Tables 2a/2b and are comparable in respect of method of preparation and particle size distribution (average particle size 50 μm). The extruded powder coating mixtures were applied to degreased steel panels with the aid of a corona spraygun. The film thickness was 50–55 μm and the baking temperature 190° and 200° C. (see Tables 3a/3b). The tests were performed according to the stated specifications.

The tendency to yellowing was determined by dividing the panels carrying the baked paint films into two and by further baking one of the two halves at 220° C. for 30 minutes.

The ΔE color difference was determined on the paint films which had been subjected to a second baking against those which had not, using the colorimeter Tricolor LFM 3 from Lange according to DIN 6174, CIE-LAB 1976.

TABLE 1

| Polyester[1] | Acid value mg of KOH/g (DIN 53402) | Glass transition temperature °C.[2] | Viscosity at 200° C. mPa.s[3] systems | Suitable for hybrid in the mixing ratio polyester: epoxy resin (EV[4] 700–900) |
|---|---|---|---|---|
| (a) | 40 ± 5 | about 52 | 4000–6000 | 70:30 |
| (b) | 60 ± 5 | about 52 | 2000–3500 | 60:40 |
| (c) | 60 ± 5 | about 52 | 2000–3300 | 50:50 |
| (d) | 53 ± 5 | about 55 | 2200–3500 | 50:50 |
|  |  |  |  | 60:40 |
| (e) | about 33 | about 52 | 4000–5500 | 70:30 |

[1]Alftalat ® AN 721 (=a)), AN 722 (=b)), AN 720 (=c)), AN 758 (=d)), VAN 02370 (e))
[2]determined with the aid of DSC Mettler TA 3000 10° C./min.
[3]determined with the aid of the ICI Cone and Plate Viscometer
[4]EV = epoxide equivalent TABLE 2a

| Powder coating mixtures (composition in parts by weight) | | | | | | | | | |
|---|---|---|---|---|---|---|---|---|---|
|  | Example 1 | Example 2 (comp.) | Example 3 | Example 4 (comp.) | Example 5 | Example 6 (comp.) | Example 7 | Example 8 (comp.) | Example 9 | Example 10 (comp.) |
| Polyester (a) | 455 | 455 |  |  |  |  |  |  |  |  |
| Polyester (b) |  |  | 385 | 385 |  |  |  |  |  |  |
| Polyester (c) |  |  |  |  | 315 | 315 |  |  |  |  |
| Polyester (d) |  |  |  |  |  |  | 315 | 315 |  |  |
| Polyester (e) |  |  |  |  |  |  |  |  | 490 | 490 |
| Epoxy resin I |  | 210 |  | 280 |  | 350 |  | 350 |  | 175 |
| Epoxy resin II | 210 |  | 280 |  | 350 |  | 350 |  | 175 |  |
| Titanium dioxide[1] | 300 | 300 | 300 | 300 | 300 | 300 | 300 | 300 | 300 | 300 |
| Flow control | 30 | 30 | 30 | 30 | 30 | 30 | 30 | 30 | 30 | 30 |

TABLE 2a-continued

| | Powder coating mixtures (composition in parts by weight) | | | | | | | | | |
|---|---|---|---|---|---|---|---|---|---|---|
| | Example 1 | Example 2 (comp.) | Example 3 | Example 4 (comp.) | Example 5 | Example 6 (comp.) | Example 7 | Example 8 (comp.) | Example 9 | Example 10 (comp.) |
| agent[2] | | | | | | | | | | |
| Benzoin | 5 | 5 | 5 | 5 | 5 | 5 | 5 | 5 | 5 | 5 |
| Approximate ratio polyester/ epoxy resin | 70/30 | 70/30 | 60/40 | 60/40 | 50/50 | 50/50 | 50/50 | 50/50 | 75/25 | 75/25 |

[1] Kronos ® 2160 from Kronos Titan
[2] Additol ® XL 496 from HOECHST AG

TABLE 2b

| | Example 11 | Example 12 | Example 13 | Example 14 | Example 15 | Example 10 (comparison) |
|---|---|---|---|---|---|---|
| Polyester (e) | 525 | 525 | 525 | 525 | 525 | 490 |
| Epoxy resin I | | | | | | 175 |
| Epoxy resin III | 140 | | | | | |
| Epoxy resin IV | | 140 | | | | |
| Epoxy resin V | | | 140 | | | |
| Epoxy resin VI | | | | 140 | | |
| Epoxy resin VII | | | | | 140 | |
| Titanium dioxide[1] | 300 | 300 | 300 | 300 | 300 | 300 |
| Flow control agent[2] | 30 | 30 | 30 | 30 | 30 | 30 |
| Benzoin | 5 | 5 | 5 | 5 | 5 | 5 |
| Approximate ratio polyester/epoxy resin | 80/20 | 80/20 | 80/20 | 80/20 | 80/20 | 75/25 |

[1] Kronos ® 2160 from Kronos Titan
[2] Additol ® XL 496 from HOECHST AG

TABLE 3a

| | | Test results on paint films after second baking at 220° C. for 30 minutes | | | | | | | | | |
|---|---|---|---|---|---|---|---|---|---|---|---|
| Powder coating mixture | | Example 1 | Example 2 (comp.) | Example 3 | Example 4 (comp.) | Example 5 | Example 6 (comp.) | Example 7 | Example 8 (comp.) | Example 9 | Example 10 (comp.) |
| Baking conditions | °C. | 190 | 190 | 200 | 200 | 200 | 190 | 190 | 190 | 200 | 200 |
| | min. | 15 | 15 | 15 | 15 | 15 | 15 | 10 | 10 | 10 | 10 |
| Film Thickness | μm | 50 | 50 | 50 | 55 | 55 | 55 | 50 | 55 | 55 | 55 |
| Gloss 60° DIN 67530 | (%) | 92 | 94 | 97 | 95 | 92 | 99 | 83 | 94 | 96 | 101 |
| Flow-out | (+) | 2 | 2 | 2 | 2 | 2 | 2 | 2 | 2 | 2 | 2 |
| Cratering | (+) | 0 | 0 | .0 | 0 | 0 | 0 | 0 | 0 | 0 | 0 |
| Erichsen indentation DIN 53156 | (mm) | 12.2 | 11.9 | 10.6 | 11.4 | 11.2 | 11.7 | 10.9 | 13.1 | 12.1 | 12.8 |
| Crosshatch DIN 53151 | (Gt) | 0 | 0 | 0 | 0 | 0 | 0 | 0 | 0 | 0 | 0 |
| Impact test ASTM D 2794 | | | | | | | | | | | |
| front side | (i.p.) | 160 | 160 | 160 | 160 | 160 | 160 | 160 | 160 | 80 | 160 |
| reverse side | (i.p.) | 160 | 160 | 160 | 160 | 160 | 160 | 160 | 160 | 60 | 160 |
| Butyl acetate test 3 min. | (+) | 4 | 4 | 3 | 3 | 3 | 3 | 4 | 4 | 4 | 5 |
| Xylene test 30 min. | (+) | 3 | 5 | 0 | 1 | 0 | 1 | 1 | 3 | 4 | 5 |
| Gel time 180° C. | (s) | 155 | 205 | 305 | 335 | 195 | 190 | 165 | 195 | 315 | 400 |
| Color difference ΔE | | 1.25 | 2.39 | 1.05 | 2.59 | 1.20 | 1.63 | 1.64 | 2.90 | 2.06 | 3.57 |

(+) = Visual assessment. Rating according to DIN 53230
0 = very good
5 = very poor

TABLE 3b

| | | Test results of the paint films | | | | | | | | | Example 10 (comparison) |
|---|---|---|---|---|---|---|---|---|---|---|---|
| | | Example 11 | | Example 12 | | Example 13 | | Example 14 | | Example 15 | |
| Baking conditions | °C. | 150 | 170 | 150 | 170 | 150 | 170 | 150 | 170 | 150 | 170 | 200 |
| | min. | 30 | 15 | 30 | 15 | 30 | 15 | 30 | 15 | 30 | 15 | 10 |
| Film Thickness | μm | 50 | 50 | 50 | 50 | 50 | 45 | 70 | 70 | 70 | 65 | 55 |
| Gloss | | 100 | 100 | 100 | 100 | 98 | 98 | 96 | 97 | 98 | 96 | 101 |

4,997,907

TABLE 3b-continued

Test results of the paint films

| | | Example 11 | | Example 12 | | Example 13 | | Example 14 | | Example 15 | | Example 10 (comparison) |
|---|---|---|---|---|---|---|---|---|---|---|---|---|
| 60° DIN 57530 | (%) | | | | | | | | | | | |
| Flow-out | (+) | 3 | 3 | 3 | 3 | 3 | 3 | 3 | 3 | 3 | 3 | 2 |
| Cratering | (+) | 0 | 0 | 0 | 0 | 0 | 0 | 1 | 1 | 1 | 1 | 0 |
| Erichsen indentation DIN 53156 | (mm) | 13.5 | 13.5 | 13.5 | 13.5 | 9.5 | 13.5 | 13.0 | 13.3 | 13.6 | 13.3 | 12.8 |
| Crosshatch test DIN 53151 | (Gt) | 1 | 1 | 1 | 1 | 1 | 1 | 0 | 0 | 0 | 0 | 0 |
| Impact test ASTM D 2794 | | | | | | | | | | | | |
| front side | (ip) | 160 | 160 | 160 | 160 | 40 | 120 | 120 | 120 | 160 | 160 | 160 |
| reverse side | (ip) | 80 | 140 | 120 | 160 | 16 | 80 | 80 | 100 | 120 | 160 | 160 |
| Butyl acetate test 3 min. | (+) | 4 | 5 | 5 | 5 | 5 | 5 | 5 | 5 | 5 | 5 | 5 |
| Xylene test 30 min. | (+) | 5 | 5 | 5 | 5 | 5 | 5 | 5 | 5 | 5 | 5 | 5 |
| Gel time 180° C. (DIN 55990, Part 8 (s)) | | 180 | | 180 | | 250 | | 205 | | 265 | | 400 |

(+) = Visual assessment. Rating:
0 = very good
5 = very poor

It can be seen from Table 3a that in tests such as Erichsen indentation, impact test, gloss, flow-out, resistance to solvents and others the powder coating films produced from powder coating mixtures according to the invention and from comparison powder coating mixtures furnish comparable results. Surprisingly, however, the powder coating mixtures according to the invention give rise to paint films with an improved resistance to yellowing. The mixtures according to the invention exhibit after a second baking of the paint films distinctly lower ΔE values, i.e. no yellowing such as shown by films obtained from powder coating mixtures according to prior art.

It can be seen from Examples 11 to 15 according to the invention listed in Table 3b that, surprisingly, these powder coating mixtures have a substantially higher reactivity (lower gel times) than those of the prior art.

It can be further concluded from Table 3b that in tests such as Erichsen indentation, impact test, gloss, flow-out, resistance to solvents and others the powder coating films obtained from the powder coating mixtures according to the invention and those from the comparison powder coating mixture furnish comparable results. However, it has also been found, surprisingly, that the epoxy resins III–VII according to the invention may be used in powder coating mixtures of 80 parts of polyester resin and 20 parts of epoxy resin and that they may be baked at distinctly lower temperatures than the comparison mixture.

We claim:

1. A curable powder mixture comprising
   (A) carboxyl-containing polyesters and
   (B) compounds containing at least two 1,2-epoxide groups, which compounds are reaction products of
      (B1) compounds containing at least two 1,2-epoxide groups per molecule and having an epoxide equivalent weight of 160 to 600, and
      (B2) aromatic dicarboxylic acids or a mixture thereof with compounds selected from the group (cyclo)aliphatic dicarboxylic acids, monocarboxylic acids and/or monohydric phenols, and
      (B3) cyclic anhydrides, if required.

2. The curable mixture as claimed in claim 1, wherein the amount of (A) is 50 to 90% by weight, based on the sum total of (A) and (B).

3. The curable mixture as claimed in claim 1, wherein the acid value of the component (A) is 15 to 150 mg of KOH/g.

4. The curable mixture as claimed in claim 1, wherein the molecular weight Mn of (A) is between 600 and 12000.

5. The curable mixture as claimed in claim 1, wherein the component (B) has an epoxide equivalent weight of 300 to 1200.

6. The curable mixture as claimed in claim 1, wherein the component (B) has an acid value of 0.01 to 20 mg of KOH/g.

7. The curable mixture as claimed in claim 1, wherein the glass temperature of the components (A) and (B) is at least 35° C.

8. The curable mixture as claimed in claim 1, wherein the reaction components (B1) have an epoxide equivalent weight of 160 to 200.

9. The curable mixture as claimed in claim 1, wherein the reaction component (B2) comprises terephthalic acid as the aromatic dicarboxylic acid.

10. The curable mixture as claimed in claim 1, wherein (cyclo)aliphatic carboxylic acids comprising 2 to 12 carbon atoms or are employed in the reaction component (B2) as the (cyclo)aliphatic carboxylic acids.

11. The curable mixture as claimed in claim 1, wherein 0.01 to 1 mol of the cyclic anhydride (B3) is used per mol of the reaction product obtained from (B1) and (B2).

12. The curable mixture as claimed in claim 1, wherein cyclic anhydrides chosen from the group succinic anhydride, phthalic anhydride, Δ$^4$-tetrahydrophthalic anhydride and hexahydrophthalic anhydride are employed as the cyclic anhydrides (B3).

13. The curable mixture as claimed in claim 1, wherein it also contains customary additives (C).

14. A substrate coated by the curable mixture as claimed in claim 1.

15. The curable mixture as claimed in claim 1, wherein (cyclo)aliphatic carboxylic acids comprising 6 to 8 carbon atoms are employed in the reaction component (B2) as the (cyclo)aliphatic carboxylic acids.

* * * * *